Dec. 23, 1947.    O. M. BURKHARDT    2,433,089
CLEARANCE REGULATING DEVICE FOR INTERNAL-COMBUSTION ENGINE VALVES
Filed Aug. 22, 1942
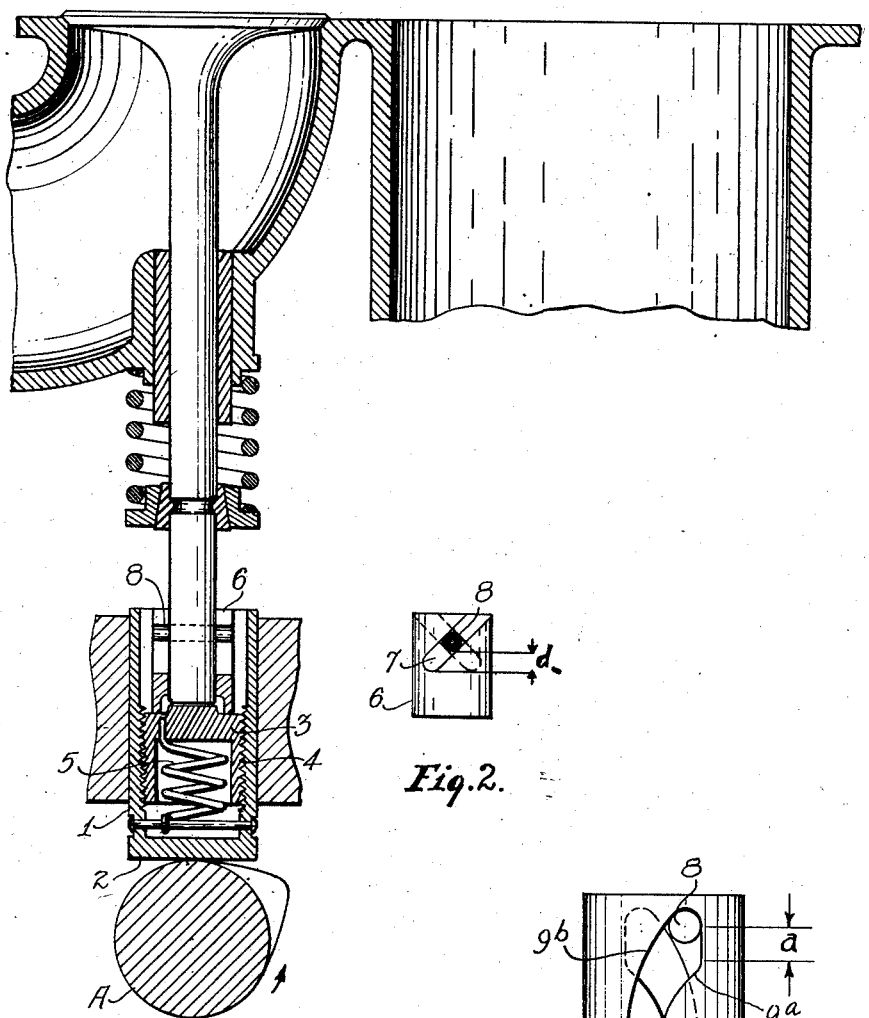
Otto M. Burkhardt
INVENTOR.
BY Milburn & Milburn Patented Dec. 23, 1947

2,433,089

UNITED STATES PATENT OFFICE 2,433,089

CLEARANCE REGULATING DEVICE FOR INTERNAL-COMBUSTION ENGINE VALVES

Otto M. Burkhardt, Cleveland, Ohio

Application August 22, 1942, Serial No. 455,709

8 Claims. (Cl. 123—90)

This invention relates to an improved device for regulating clearance in the valve linkage of an internal combustion engine, the regulator being positioned in the valve linkage and such regulation being effected automatically.

In a general way, this device comprises interengaging screw-threaded companion members which are provided with means for normally tending to force them into extended or lengthened condition for the purpose of taking up clearance, and which are adapted also to be screwed together so as to shorten the length of the regulator device for the purpose of creating clearance. In this same general combination, I have previously utilized the relative tilting or cocking movement between the interengaging companion members as is occasioned by certain eccentric forces due to the engagement of the lobe of the cam shaft with the regulator device, there being provided suitable lateral clearance between the members and it being recognized that the driving force of the cam lobe occasions a horizontal as well as a vertical component of engagement with the device, as has been more fully explained in my prior Patent No. 2,222,138, November 18, 1940.

But in certain designs of internal combustion engines where the working clearances are held exceedingly small, such eccentric forces may be absorbed by close-fitting guides and the driving force as is imparted to the clearance regulator members becomes nearly parallel with the axis of the valve. In most of these cases the design is such that the horizontal component is manifest only as a side thrust upon a close-fitting guide but is not available to perform that function which it successfully performs in the type of clearance regulator disclosed in the above-mentioned patent. Designers of such engines usually prefer other positive means to ensure reliable functioning of valve clearance regulators. Accordingly, the device shown herein has been provided for those situations where the driving force is preponderantly parallel to the center line of the clearance regulator or the valve so that a horizontal component is not required for the reliable functioning of the clearance regulator.

It is understood, of course, that too little clearance in the valve linkage prevents proper seating of the valve, while too much clearance renders the operation of the mechanism noisy. To ensure proper seating of the valve, it is necessary that the valve does not stick; and the present invention is based upon this as well as the other considerations, supra, especially under the particular circumstances mentioned above.

Accordingly, one object of the present invention consists in devising means for automatically providing clearance in the valve linkage, each cam shaft revolution, so as to ensure proper seating of the valve.

Another object is to provide a device that is capable of operating in such manner without either a horizontal component or eccentric force, above referred to; the present device being intended to perform all of the required functions of an automatic clearance regulator with only a force parallel to its own axis for operating the same.

A further object of my invention is to provide such a device with means for converting rectilinear force into rotational energy so as to effect relative rotary movement between the members of the regulator.

A still further object is to devise a means for effecting automatically a rotary movement of the valve for the purposes explained.

Another object is to provide an automatic clearance regulator in which the same part thereof is effective in producing clearance between the companion members of the device and also in producing rotary movement of the valve.

Other objects will appear from the following description and claims when considered together with the accompanying drawing.

Fig. 1 is a sectional view of my device in assembly;

Fig. 2 is an elevation of the first form of slotted sleeve; and

Fig. 3 shows a sleeve member with modified form of slot.

It is to be understood that the present disclosure is merely for the purpose of illustration and that there might be devised various modifications thereof without departing from the spirit of the present invention as herein set forth and claimed.

Referring now to the device in detail, the outer member 1 has its mushroom end 2 in contact with the cam lobe of the cam shaft A, and the inner member 3 has screw-threaded engagement with its companion member 1, as indicated at 4. Within the members 1 and 3 there is provided a spring means 5, the upper end of which is anchored in a suitable hole provided in member 3 while the other end thereof is hooked about a transverse bar mounted within the outer member 1. The torque of spring means 5 normally tends to screw members 1 and 3 apart. Any axial tension of the spring will hold the threaded surfaces together while compression will tend to keep them apart if clearance within the mechanism should permit of it.

Now, in order to make certain that during the valve-operating period the members 1 and 3 will screw together a controlled micrometric amount, an auxiliary member 6 is provided. This member is intended to perform the same general function as element 7 in my prior Patent No. 2,283,536, May 19, 1942, namely to convert rectilinear into rotary motion. In the present case, the novelty resides in the fact that member 6 acts upon member 3 by inertia preferably only after the closing of the valve. This invention takes into account and utilizes the fact that the valve-lifting as well as the valve-closing consist each of two periods, namely one period when the valve is accelerated and the other period when the valve is retarded.

The valve is first accelerated upwards by the cam through the tappet. The sleeve 6 rests firmly upon the member 3 and is therefore accelerated upwards at the same rate as member 3 and the valve resting thereupon. All parts attain maximum velocity together, which occurs usually when the valve is about one-quarter to one-half open.

Thereafter, still during the valve-lifting period, the valve is retarded by the action of the valve spring until the velocity thereof is zero and the valve is fully open. During this period the pressure in the valve linkage is low because, at high speed, the spring pressure is fully required to retard the valve and the linkage; and, at low speed, the spring pressure is partly required for this purpose. However, element 6 is free to continue its upward travel, during this period, due to its inertia and it is guided by the valve stem to travel along a path corresponding with its own axis and that of the valve stem.

By means of the inclined groove 7 in element 6 and an interengaging pin 8 fixed in the valve stem, the element 6 is urged during its travel along its own axis to convert some of its kinetic rectilinear energy into rotational energy, which somewhat slows down the velocity of the element 6 in its travel along the axis of the valve stem. When pin 8 touches the end of the inclined groove 7, then all of the kinetic energy stored in element 6 is imparted to the pin 8 and thence to the valve to which the pin is fixed. This transfer of kinetic energy from element 6 to the valve has the following effect. That component part of kinetic energy due to the velocity of the sleeve 6 along the axis of the valve, when imparted to the valve, will cause the latter to lift a very small amount. This impact occurs when the valve is very susceptible to receive from element 6 that component part of kinetic energy which produces rotation. Under the prevailing circumstances, this transfer of even a small amount of rotational kinetic energy from element 6 to the valve will cause the valve to turn a very small amount about its own axis. This is a very important feature for all internal combustion engines because such rotation of the valve not only tends to keep it from sticking in its guide, but such turning prevents also uneven heating of the circumference of the valve seat. This in turn prevents warping, leaking and burning of the valve, all of which ensures more power and longer life of the engine.

Then, when the valve has reached its maximum lift and consequently its zero velocity and after element 6 has imparted its kinetic energy (axial and rotational) to the valve, it is urged by the valve spring to close again. During zero velocity of the valve, element 6 remains substantially in its uppermost position. The cam contour helps to control the valve closing, which proceeds very much faster than the falling of a body by gravity. Therefore, during its first valve-closing period, element 6 is accelerated downwards with the valve through pin 8 more or less at the same rate that the valve is accelerated downwards.

When the valve has reached its maximum closing velocity, the cam contour retards the valve but element 6 is free to continue for a distance $d$ which, of course, is determined by the length of the slots 7. The valve will close as usual and come to rest on the valve seat; and this relieves the entire valve linkage of the influence of the spring pressure. The element 6 then imparts its combined axial and rotational kinetic energy to the clearance regulator element 3, with the result that it will screw element 3 against the torque of the spring means 5 into the clearance regulator element 1 a controllable small amount. This creates a slight clearance in the valve linkage and ensures firm valve-closing and is also calculated to compensate for any expansion that may have taken place during the lifting and closing of the valve. The spring means 5 then promptly turns the threaded companion members 1 and 3 relatively to each other in the opposite manner; with the result that there is eliminated all clearance that may exist in the valve linkage without, however, in any way interfering with the firm seating of the valve.

Among the several advantages that result from the use of my present invention, there may be noted the following. This device will ensure firm closing of the valve; it will give constant timing in the valve operation; it will operate in a quiet, positive and dependable manner; and it will effect a small amount of turning of the valve for every cam shaft revolution.

By employing the form of slotted sleeve shown in Fig. 3, it is possible to regulate the impacts upon the valve and the member 3, respectively. The sleeve 9, with the modified form of slot, may be substituted for the slotted sleeve 6 in the present combination.

Since the valve is heavier than the regulator member 3, it may require greater impact for its rotary motion than in the case of the member 3. Remembering that the upward movement of the sleeve member, by virtue of the pin and slot, has the effect of causing rotary movement of the valve, and that the downward movement of the sleeve has the effect of turning the regulator member 3, such effect of the slotted sleeve 9, upon its upward movement, may be amplified by making the groove in the sleeve of an irregular form, as clearly indicated in Fig. 3. Accordingly, after the valve has attained maximum velocity during the valve-opening period, and its motion is slowed down by the resistance of the valve spring, sleeve 9 will continue at full speed along a straight path $a$, as indicated in Fig. 3. Then suddenly the pin contacts a rather sharply curved edge portion $9a$ of the slot, which will impart a sharp impact to the valve and a corresponding rotary movement of the same will follow. As the sleeve 9 continues its upward motion, the lower end of the slot will come into engagement with the pin and the remaining kinetic energy of the sleeve will be imparted to the valve, which results in an increased valve lift.

During the first valve-closing period, the sleeve 9 is accelerated downward with the valve more or less at the same rate as the valve. Then, when the valve has reached its maximum closing velocity and is retarded by the cam contour, the sleeve 9 will continue for a certain distance, as above explained in connection with sleeve 6. That is, the retarding of the valve movement will be accompanied by a continued movement of the sleeve 9, the edge 9b of the slot passing along the pin and in engagement therewith. As indicated in Fig. 3, the curvature of this edge 9b is of a comparatively slight and continuous form. Then, when the valve has closed, the continued movement of the sleeve, by its inertia, will impart a turning motion to the regulator member 3 so as to cause the same to be screwed into its companion member 1 and thus create clearance. As will be seen, the impact that causes this rotary motion of member 3 is less than that imparted to the valve at the end of the valve-opening period, this difference being due to the difference between the rather abrupt edge portion 9a of the slot and the rather gradual form of the edge portion 9b. Otherwise, the function of the sleeve 9 is the same as that of the sleeve.

The practical value of the several advantages, as above noted, is believed to require no extended comment. Furthermore, the dual function of the sleeve member contributes to the simplicity and comparatively low cost of manufacture of this device.

Other practical advantages, flowing from this invention, may suggest themselves to those who are familiar with the art to which it relates.

What I claim is:

1. In an internal combustion engine, having a valve-operating linkage in which a driven element is operated through a force exerted preponderantly in a direction corresponding with that of the movement of the linkage mechanism, a clearance regulator arranged in the valve linkage and comprising interengaging companion members that are capable of rotatable longitudinal adjustment with respect to each other, auxiliary means having operative longitudinal engagement with one of said companion members and being provided with inclined sliding surfaces, transversely disposed means arranged in the linkage other than said clearance regulator and having engagement with said sliding surfaces, said parts being so constructed and arranged that part of said force will be converted by said interengaging surfaces and transversely disposed means into rotational force for effecting relative rotative movement between said companion members for the purpose of creating clearance therebetween, and spring means between said members for normally extending the same so as to take up clearance.

2. In an internal combustion engine, having a valve-operating linkage in which a driven element is operated through a force exerted preponderantly in a direction corresponding with that of the movement of the linkage mechanism, a clearance regulator arranged in the valve linkage and comprising interengaging companion members that are capable of rotatable longitudinal adjustment with respect to each other, a sleeve surrounding the stem of the valve in said linkage and having operative longitudinal engagement with one of said companion members and having an inclined slot, a transversely disposed pin extending from said valve stem and having engagement in said slot, said parts being so constructed and arranged that part of said force will be converted by said pin and slot means into rotational force for effecting relative rotative movement between said companion members for the purpose of creating clearance therebetween and will effect a turning movement of the valve, and spring means between said members for normally extending the same so as to take up clearance.

3. In an internal combustion engine, having a valve-operating linkage in which a driven element is operated through a force exerted preponderantly in a direction corresponding with that of the movement of the linkage mechanism, a clearance regulator arranged in the valve linkage and comprising interengaging companion members that are capable of rotatable longitudinal adjustment with respect to each other, a sleeve surrounding the stem of the valve in said linkage and having operative longitudinal engagement with one of said companion members and having an inclined slot, a transversely disposed pin extending from said valve stem and having engagement in said slot, said sleeve being free for continued movement due to inertia at the end of the valve-opening and valve-closing periods, said parts being so constructed and arranged that part of said force will be converted by said pin and slot means into rotational force for effecting rotative movement of the valve at the end of the valve-opening period and for effecting relative rotative movement between said companion members at the end of the valve-closing period for the purpose of creating clearance, and spring means between said members for normally extending the same so as to take up clearance.

4. In an internal combustion engine, having a valve-operating linkage in which a driven element is operated through a force exerted preponderantly in a direction corresponding with that of the movement of the linkage mechanism, a clearance regulator arranged in the valve linkage and comprising companion members that are in engagement with each other and are capable of rotatable longitudinal adjustment with respect to each other, transversely disposed means arranged in the valve linkage other than said clearance regulator, and means having operative engagement therewith and having operative longitudinal engagement with the end of one of said companion members, said parts being so constructed and arranged that part of said force will be converted by both of said means into rotational force for effecting rotative movement of said one companion member with respect to the other of said companion members for the purpose of creating clearance therebetween, and spring means between said members for normally extending the same so as to take up clearance.

5. In an internal combustion engine, having a valve-operating linkage in which a driven element is operated through a force exerted preponderantly in a direction corresponding with that of the movement of the linkage mechanism, a clearance regulator arranged in the valve linkage and comprising interengaging companion members that are capable of rotatable longitudinal adjustment with respect to each other, means arranged in the valve linkage and in operative longitudinal engagement with one of said companion members and having inclined surfaces, transversely disposed means associated with the valve stem and adapted for co-operative engagement with said inclined surfaces, said parts being so constructed and arranged that part of said force will be converted by both of said means into rotational force for effecting rotative movement of the valve at the end of the valve-opening period and for effecting relative rotative movement between said companion members at the end of the valve-closing period for the purpose of creating clearance between said companion members, and spring means between said members for normally extending the same so as to take up clearance.

6. In an internal combustion engine, having a valve-operating linkage in which a driven element is operated through a force exerted preponderantly in a direction corresponding with that of the movement of the linkage mechanism, a clearance regulator arranged in the valve linkage and comprising interengaging companion members that are capable of rotatable longitudinal adjustment with respect to each other, a sleeve arranged in the valve linkage and in operative longitudinal engagement with the end of one of said companion members and having an inclined slot therein, transversely disposed means arranged in the valve linkage other than said clearance regulator and having operative engagement with the side edges of said slot, said slot having a substantially straight edge portion and an inclined edge portion arranged for successive engagement with said transverse means during the valve-opening period, said parts being so constructed and arranged that part of said force will be converted by said means into rotational force for effecting relative rotative movement between said companion members for the purpose of creating clearance therebetween, and spring means between said members for normally extending the same so as to take up clearance.

7. In an internal combustion engine, having a valve-operating linkage in which a driven element is operated through a force exerted preponderantly in a direction corresponding with that of the movement of the linkage mechanism, a clearance regulator arranged in the valve linkage and comprising interengaging companion members that are capable of rotatable longitudinal adjustment with respect to each other, a sleeve arranged in the valve linkage and in operative longitudinal engagement with the end of one of said companion members and having a slot therein, transversely disposed companion means arranged in the valve linkage other than said clearance regulator and having operative engagement with the side edges of the said slot, said slot having a substantially straight edge portion and an inclined edge portion arranged for successive engagement with said transverse means during the valve-opening period and having a gradually inclined edge portion for engagement with said transverse means during the valve-closing period, said parts being so constructed and arranged that part of said force will be converted by said means into rotational force for effecting relative rotative movement between said companion members for the purpose of creating clearance between them, and spring means between said members for normally extending the same so as to take up clearance.

8. In an internal combustion engine, having a valve-operating linkage in which a driven element is operated through a force exerted preponderantly in a direction corresponding with that of the movement of the linkage mechanism, a clearance regulator arranged in the valve linkage and comprising companion members that are in engagement with each other and are capable of rotatable longitudinal adjustment with respect to each other, spring means arranged between said members for normally extending the same so as to take up clearance, and means arranged between and having operative engagement with one of said companion members and said valve linkage, other than said clearance regulator, for converting part of said force into rotational force for effecting rotative movement of said one companion member with respect to the other of said companion members for the purpose of creating clearance therebetween.

OTTO M. BURKHARDT.

REFERENCES CITED

The following references are of record in the file of this patent:

UNITED STATES PATENTS

| Number | Name | Date |
| --- | --- | --- |
| 1,213,590 | Compton | Jan. 23, 1918 |
| 1,903,078 | Woolman | Mar. 28, 1933 |
| 1,905,888 | Berry | Apr. 25, 1933 |
| 1,930,261 | Berry | Oct. 10, 1933 |
| 1,705,464 | Abell | Mar. 19, 1929 |
| 1,955,110 | Brockway | Apr. 17, 1934 |
| 1,995,765 | Carle | Mar. 26, 1935 |
| 2,176,895 | Engemann | Oct. 24, 1939 |
| 1,609,202 | Ritts | Nov. 30, 1926 |
| 2,131,507 | Goodwin | Sept. 27, 1938 |